(12) United States Patent
Mullin

(10) Patent No.: US 11,503,806 B1
(45) Date of Patent: Nov. 22, 2022

(54) DOG DENTAL DEVICE WITH BRUSHES EXTENDING THROUGH COMPRESSIBLE OUTER SHELL

(71) Applicant: Make Ideas, LLC, La Jolla, CA (US)

(72) Inventor: Keith Alan Mullin, La Jolla, CA (US)

(73) Assignee: MAKE IDEAS LLC, La Jolla, CA (US)

( * ) Notice: Subject to any disclaimer, the term of this patent is extended or adjusted under 35 U.S.C. 154(b) by 653 days.

(21) Appl. No.: 16/438,817

(22) Filed: Jun. 12, 2019

Related U.S. Application Data

(60) Provisional application No. 62/683,746, filed on Jun. 12, 2018.

(51) Int. Cl.
*A01K 15/02* (2006.01)
*A46B 15/00* (2006.01)

(52) U.S. Cl.
CPC ............ *A01K 15/026* (2013.01); *A46B 15/00* (2013.01); *A46B 2200/1086* (2013.01)

(58) Field of Classification Search
CPC ............................... A01K 15/026; A61D 5/00
USPC ........................................... 119/707, 709–710
See application file for complete search history.

(56) References Cited

U.S. PATENT DOCUMENTS

| 1,006,182 A | 10/1911 | Cousin |
| 1,022,112 A | 4/1912 | Smith |
| 1,031,095 A | 7/1912 | Smith |
| 1,177,505 A | 3/1916 | Fleming |
| 1,534,964 A | 4/1925 | Kahnweiler |
| 1,544,618 A | 7/1925 | Waite |
| 2,086,631 A | 7/1937 | Munro |
| 2,725,234 A | 11/1955 | Coble et al. |
| 2,964,872 A | 12/1960 | Coleman |
| 3,372,846 A | 3/1968 | Berkus |
| 3,445,917 A | 5/1969 | Adler |

(Continued)

FOREIGN PATENT DOCUMENTS

| CN | 104642179 A | * | 5/2015 | ........... A01K 15/026 |
| CN | 104642183 A | * | 5/2015 | ........... A01K 15/026 |

(Continued)

OTHER PUBLICATIONS

"International Search Report" and "Written Opinion of the International Search Authority" (ISA/US) in the Kong Company, LLC, International Patent Application Serial No. PCT/US2017/053017, dated Mar. 7, 2018 (7 pages).

(Continued)

*Primary Examiner* — Peter M Poon
*Assistant Examiner* — Morgan T Jordan

(57) ABSTRACT

A pet dental device includes a main body and an outer shell. The main body houses a pressure-actuated sound generator and that has outer surfaces from which a plurality of brushes extend. The outer shell covers at least a portion of the main body such that a gap exists between the shell and the outer surfaces of the main body, and includes a plurality of brush ports aligned with the brushes. The outer shell is sufficiently flexible to be compressed inward by a selected animal's jaws such that toothpaste is distributed via the brushes to teeth of the selected animal and such that sounds are generated, via the pressure-actuated sound generator housed in the main body, more or less simultaneously with the distribution of toothpaste.

14 Claims, 18 Drawing Sheets

(56) References Cited

U.S. PATENT DOCUMENTS

| | | | |
|---|---|---|---|
| 3,583,059 A | 6/1971 | Ceolin | |
| 3,744,798 A | 7/1973 | Schmid | |
| 3,830,202 A | 8/1974 | Garrison | |
| 3,853,412 A * | 12/1974 | Griffin | A46B 11/0041 |
| | | | 401/268 |
| 3,918,196 A | 11/1975 | Schleich | |
| 4,124,135 A | 11/1978 | Weder et al. | |
| 4,356,659 A | 11/1982 | Clarke | |
| 4,366,930 A | 1/1983 | Trombetti, Jr. | |
| 4,611,556 A | 9/1986 | Frank | |
| 4,738,001 A | 4/1988 | Shipp | |
| 4,825,812 A | 5/1989 | Visalli et al. | |
| 4,831,058 A | 5/1989 | Pankhania et al. | |
| 4,907,537 A | 3/1990 | Shirk | |
| D317,632 S | 6/1991 | Mariol | |
| 5,072,481 A | 12/1991 | Weyer | |
| RE34,352 E | 8/1993 | Markham | |
| 5,232,130 A | 8/1993 | Woodard | |
| 5,263,436 A | 11/1993 | Axelrod | |
| 5,367,986 A | 11/1994 | O'Rourke et al. | |
| 5,427,120 A | 6/1995 | Wong | |
| 5,553,570 A | 9/1996 | VanNatter, III et al. | |
| 5,560,320 A | 10/1996 | Plunk | |
| 5,595,142 A | 1/1997 | Chill | |
| 5,647,302 A | 7/1997 | Shipp | |
| 5,709,165 A | 1/1998 | Nurmikko | |
| 5,720,048 A | 2/1998 | Perez | |
| D393,421 S | 4/1998 | Kovens | |
| 5,792,470 A | 8/1998 | Baumgardner, Sr. | |
| 5,799,616 A | 9/1998 | McClung, III | |
| 5,819,690 A | 10/1998 | Brown | |
| 5,832,877 A | 11/1998 | Markham | |
| 5,853,757 A | 12/1998 | Durand et al. | |
| 5,865,146 A | 2/1999 | Markham | |
| D408,473 S | 4/1999 | Millman et al. | |
| 5,895,662 A | 4/1999 | Meyer | |
| 5,928,213 A | 7/1999 | Barney et al. | |
| 5,944,516 A * | 8/1999 | Deshaies | A61D 5/00 |
| | | | 15/167.1 |
| 5,965,182 A | 10/1999 | Lindgren | |
| 5,988,424 A | 11/1999 | Kovens | |
| 6,050,224 A | 4/2000 | Owens | |
| 6,098,571 A | 8/2000 | Axelrod et al. | |
| 6,099,872 A | 8/2000 | Whetstone | |
| 6,112,703 A * | 9/2000 | Handelsman | A01K 15/026 |
| | | | 446/221 |
| 6,116,191 A * | 9/2000 | Suchowski | A01K 15/026 |
| | | | 119/710 |
| D431,886 S | 10/2000 | Owens | |
| D432,741 S | 10/2000 | Owens | |
| 6,143,316 A | 11/2000 | Hayden et al. | |
| 6,148,771 A | 11/2000 | Costello | |
| 6,174,214 B1 | 1/2001 | Cooper | |
| 6,186,096 B1 | 2/2001 | Miller | |
| 6,211,246 B1 | 4/2001 | Gelotte et al. | |
| 6,217,408 B1 | 4/2001 | Willinger | |
| 6,237,538 B1 | 5/2001 | Tsengas | |
| 6,253,712 B1 | 7/2001 | Johnson | |
| 6,405,681 B1 | 6/2002 | Ward | |
| 6,415,741 B2 | 7/2002 | Suchowski et al. | |
| 6,427,634 B1 | 8/2002 | Mann | |
| 6,439,166 B1 | 8/2002 | Markham | |
| 6,484,671 B2 | 11/2002 | Herrenbruck | |
| 6,526,912 B1 | 3/2003 | Ottoson | |
| 6,565,404 B2 | 5/2003 | Oblack | |
| 6,578,527 B1 | 6/2003 | Mathers | |
| 6,601,539 B1 | 8/2003 | Snook | |
| 6,609,944 B1 | 8/2003 | Viola | |
| 6,622,659 B2 | 9/2003 | Willinger | |
| 6,623,328 B1 | 9/2003 | Theel | |
| 6,634,318 B1 | 10/2003 | Rucker | |
| 6,651,590 B2 | 11/2003 | Willinger et al. | |
| 6,681,721 B1 | 1/2004 | Buschy | |
| 6,688,258 B1 | 2/2004 | Kolesar | |
| 6,739,287 B1 | 5/2004 | Sarantis | |
| 6,840,197 B1 | 1/2005 | Frompke | |
| 6,848,396 B2 | 2/2005 | Carleson et al. | |
| D505,233 S | 5/2005 | Viola | |
| 6,899,059 B1 | 5/2005 | Crane et al. | |
| 6,918,355 B1 | 7/2005 | Arvanites | |
| D511,029 S | 10/2005 | Willinger | |
| D513,816 S | 1/2006 | Crane et al. | |
| 6,990,762 B1 | 1/2006 | Muday et al. | |
| 7,017,523 B2 * | 3/2006 | Handelsman | A01K 15/026 |
| | | | 119/707 |
| 7,087,260 B2 | 8/2006 | Axelrod | |
| 7,096,826 B2 | 8/2006 | Markham | |
| 7,144,293 B2 | 12/2006 | Mann et al. | |
| D540,496 S | 4/2007 | Axelrod | |
| 7,367,283 B2 | 5/2008 | Aboujaoude et al. | |
| 7,389,748 B2 | 6/2008 | Shatoff | |
| 7,426,903 B2 | 9/2008 | Simon | |
| 7,600,488 B2 | 10/2009 | Mann | |
| 7,644,684 B2 | 1/2010 | Ritchey | |
| 7,694,676 B2 | 4/2010 | Wachtel | |
| 7,762,214 B2 | 7/2010 | Ritchey | |
| D626,706 S | 11/2010 | Ragonetti | |
| 7,823,542 B2 | 11/2010 | Freeman | |
| 7,870,839 B2 | 1/2011 | Sacra | |
| 7,992,737 B2 | 8/2011 | Salice | |
| 8,166,600 B2 | 5/2012 | Lee | |
| 8,225,747 B2 | 7/2012 | Markham et al. | |
| 8,231,920 B2 | 7/2012 | Axelrod et al. | |
| 8,240,273 B2 | 8/2012 | Benson | |
| 8,413,612 B2 | 4/2013 | Smith | |
| 8,464,666 B2 | 6/2013 | Chefetz et al. | |
| 8,474,404 B2 | 7/2013 | Costello | |
| 8,479,687 B2 | 7/2013 | Anderson et al. | |
| D688,012 S | 8/2013 | Canello et al. | |
| 8,501,218 B2 | 8/2013 | Hurwitz | |
| 8,522,725 B1 | 9/2013 | Moore | |
| 8,640,647 B2 | 2/2014 | Dotterer | |
| D710,554 S | 8/2014 | Byrne | |
| 8,875,662 B2 | 11/2014 | Angle et al. | |
| 8,904,966 B2 | 12/2014 | Kolozsvari et al. | |
| D721,210 S | 1/2015 | Diskin | |
| 8,935,992 B2 | 1/2015 | Axelrod et al. | |
| 8,944,011 B2 | 2/2015 | Kirschbaum | |
| 9,027,512 B2 | 5/2015 | Prange et al. | |
| 9,107,390 B1 | 8/2015 | Day | |
| 9,364,305 B2 | 6/2016 | Lynch | |
| 9,498,433 B1 | 11/2016 | Mullin et al. | |
| 9,629,338 B2 * | 4/2017 | Bianchi | A01K 15/026 |
| 9,844,207 B1 * | 12/2017 | Wright | A46B 3/00 |
| 9,844,703 B1 | 12/2017 | Gupta et al. | |
| 9,931,297 B1 | 4/2018 | Mullin | |
| D822,295 S | 7/2018 | Woods et al. | |
| 10,285,380 B1 | 5/2019 | Mullin | |
| 10,448,615 B1 | 10/2019 | Mullin | |
| 2001/0029903 A1 * | 10/2001 | Suchowski | A01K 15/026 |
| | | | 119/704 |
| 2002/0073927 A1 | 6/2002 | Chamberlain | |
| 2002/0139708 A1 | 10/2002 | Lien | |
| 2003/0079693 A1 | 5/2003 | Jager | |
| 2004/0134446 A1 * | 7/2004 | Keller | A01K 15/026 |
| | | | 119/707 |
| 2004/0216639 A1 | 11/2004 | Handelsman | |
| 2004/0244719 A1 | 12/2004 | Jager | |
| 2005/0045115 A1 | 3/2005 | Mann | |
| 2005/0092641 A1 | 5/2005 | Marsden et al. | |
| 2005/0166865 A1 * | 8/2005 | Handelsman | A01K 15/026 |
| | | | 119/709 |
| 2006/0048718 A1 * | 3/2006 | Mann | A01K 15/026 |
| | | | 119/710 |
| 2006/0060154 A1 | 3/2006 | Wesely | |
| 2006/0102099 A1 | 5/2006 | Edwards | |
| 2006/0107905 A1 | 5/2006 | Axelrod | |
| 2006/0260560 A1 | 11/2006 | Renforth et al. | |
| 2007/0015100 A1 | 1/2007 | Morris | |
| 2007/0068464 A1 | 3/2007 | Smith et al. | |
| 2007/0101946 A1 | 5/2007 | Penny | |
| 2007/0261644 A1 | 11/2007 | Simon | |
| 2008/0083378 A1 | 4/2008 | Pearce | |
| 2008/0141948 A1 | 6/2008 | Renforth et al. | |

(56) References Cited

U.S. PATENT DOCUMENTS

| | | |
|---|---|---|
| 2008/0302802 A1 | 12/2008 | Ramsden |
| 2009/0050073 A1 | 2/2009 | Simon |
| 2009/0078214 A1 | 3/2009 | Mann |
| 2009/0095231 A1* | 4/2009 | Axelrod ............... A01K 15/026 119/709 |
| 2009/0314221 A1 | 12/2009 | Wang |
| 2010/0083910 A1* | 4/2010 | Axelrod ............ B29C 66/73152 264/249 |
| 2010/0180832 A1 | 7/2010 | Krauss |
| 2010/0224138 A1 | 9/2010 | Axelrod et al. |
| 2011/0011351 A1* | 1/2011 | Simoni ............... A01K 15/026 119/709 |
| 2011/0256208 A1 | 10/2011 | Ling |
| 2012/0012068 A1 | 1/2012 | Costello |
| 2012/0031348 A1* | 2/2012 | Markham ............ A01K 15/026 119/707 |
| 2012/0090554 A1 | 4/2012 | Nunn et al. |
| 2012/0111284 A1 | 5/2012 | Berger |
| 2012/0279459 A1 | 11/2012 | Angle et al. |
| 2012/0321706 A1 | 12/2012 | Masri et al. |
| 2013/0036988 A1 | 2/2013 | Lai |
| 2013/0047932 A1 | 2/2013 | Salmon Hyder et al. |
| 2013/0092097 A1 | 4/2013 | Cooper |
| 2013/0142936 A1 | 6/2013 | Stern et al. |
| 2013/0167780 A1 | 7/2013 | Axelrod et al. |
| 2014/0123421 A1* | 5/2014 | Minano ............... A46B 15/0016 15/110 |
| 2014/0202396 A1 | 7/2014 | Hansen |
| 2014/0261195 A1 | 9/2014 | Reiss et al. |
| 2014/0345532 A1 | 11/2014 | Valle |
| 2015/0000611 A1 | 1/2015 | Cooper |
| 2015/0068460 A1 | 3/2015 | Jones et al. |
| 2015/0083052 A1* | 3/2015 | Glaser ................. A01K 15/026 119/709 |
| 2015/0164047 A1 | 6/2015 | Watts et al. |
| 2015/0237829 A1 | 8/2015 | Tsengas |
| 2015/0237830 A1 | 8/2015 | Sternal et al. |
| 2015/0373950 A1 | 12/2015 | Spring |
| 2016/0037751 A1 | 2/2016 | Byrne |
| 2016/0113243 A1 | 4/2016 | Mullin et al. |
| 2016/0242391 A1 | 8/2016 | Stone et al. |
| 2016/0273738 A1 | 9/2016 | Wolfinbarger |
| 2016/0316719 A1 | 11/2016 | Pamess |
| 2018/0000048 A1 | 1/2018 | Stone et al. |
| 2018/0098524 A1 | 4/2018 | Zhang |
| 2018/0243063 A1* | 8/2018 | Coopersmith ........... A61D 7/00 |
| 2018/0263214 A1 | 9/2018 | Mcmillan et al. |
| 2018/0295811 A1 | 10/2018 | Dertsakyan |
| 2019/0133082 A1 | 5/2019 | Becattini, Jr. et al. |
| 2021/0176965 A1 | 6/2021 | Mullin |

FOREIGN PATENT DOCUMENTS

| | | | |
|---|---|---|---|
| GB | 2253329 A | 9/1992 | |
| GB | 2413503 A * | 11/2005 | ........... A01K 15/026 |
| GB | 2476286 A1 | 6/2011 | |
| WO | WO-9747186 A1 * | 12/1997 | ........... A01K 15/026 |
| WO | WO-2004043142 A1 * | 5/2004 | ........... A01K 15/026 |
| WO | WO-2012050602 A2 * | 4/2012 | ........... A01K 15/026 |
| WO | WO-2018096524 A1 * | 5/2018 | ........... A01K 15/026 |
| WO | 2021119631 A1 | 6/2021 | |

OTHER PUBLICATIONS

"Busy Buddy" by Petsafe. <https://web.archive.org/web/20131017005029/https://www.petsafe.net/b . . . >, accessed Oct. 17, 2013, (9 pages).

"PetSafe Busy Buddy Kibble Nibble Meal Dispensing Dog Toy". Amazon.com: Customer reviews: PetSafe Busy Buddy Kibble Nibble Meal Dispensing Dog Toy. <https://www.amazon.com/product-reviews/B001F0RRUA/ref=cm_cr_ge>, accessed Nov. 15, 2008, (3 pages).

"Ethical 5785 Seek-a-Treat Discovery Wheel Dispensing Puzzle", Amazon.com: Customer reviews: Ethical 5785 Seek-A-Treat Discovery Wheel Dispensing Puzzle, <https://www.amazon.com/Ethical-5785-Treat-Discovery-Dispensing/pro>, accessed Jan. 25, 2018, (3 pages).

"Bionic Bone" by Bionic, </web/20150402012040/https: //www.indestructibledog.com/pages/guarantee>, accessed Jun. 9, 2017, (3 pages).

Nina Ottosson—Pet activity toys & treat puzzle games, <https://web.archive.org/web/20110209120033/http://www.nina-ottosson . . . >, accessed Jan. 25, 2018, (2 pages).

"Planet Dog Mazee" YouTube video, Sep. 12, 2012.

* cited by examiner

100

140

130

DOG DENTAL DEVICE WITH BRUSHES EXTENDING THROUGH COMPRESSIBLE OUTER SHELL

CROSS-REFERENCE TO RELATED APPLICATION

The present application is a U.S. nonprovisional patent application of, and claims priority under 35 U.S.C. § 119(e) to, U.S. provisional patent application Ser. No. 62/683,746 filed Jun. 12, 2018, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to animal toothbrushes and tools, and more specifically it relates to a dog dental tool with brushes and dual chambers and a method of use, where by, a user can give the dental tool to their dog, and the dog can brush their teeth by operating or chewing the dental tool while simultaneously emitting a sound.

Background

It is well known that dogs and other pets get dirty teeth, and it is typically difficult to clean the teeth of a dog or other pet. In many cases, dogs are taken to a veterinarian and put under general anesthetic so the veterinarian can perform dental cleaning and care. However, pet toothbrushes and various dental tools to clean pet teeth have been in use for years. Typical devices include finger brushes, rubber chew brushes, flossing rope, eatable treats, and the like. Some such prior art dog teeth cleaning devices are referenced in the following patent or patent application publications: U.S. Pat. No. 8,164,600B2, US20070101946A1, U.S. Pat. Nos. 5,072,481A, 6,739,287B1, 5,720,048A, US20060102099A1, GB2476286A, U.S. Pat. No. 9,364,305B2, US20060107905A1, U.S. Pat. Nos. 4,738,001A, 5,263,436A, 5,647,302A, 5,560,320A, 7,087,260B2, and 6,050,224A. Prior art devices such as those listed above are often "chew toys" with an exterior surfaces or other features designed to scrape teeth, rope or cloth toys that floss teeth when bitten, gloves or finger brushes to manually brush teeth, or manual brushes with a handle (similar method to human teeth brushing) for a user to brushes a dog's teeth manually.

The above mentioned prior art devices each fall short in providing a single tool which a dog or pet can use on their own, by chewing, which cleans their teeth and gums with a cleaning agent such as toothpaste or gel and a brushing motion. The above mentioned prior art devices also fail to provide sufficient entertainment or interest, such as through the use of one or more sounds triggered by the dog or pet, to ensure they use the device long enough to thoroughly clean their teeth and gums. Thus a need exists for a toy like device which is also a teeth cleaning device that sufficiently encourages and empowers dogs and other pets to clean their teeth during play.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

Broadly defined, the present invention according to one aspect is a pet dental device, including: a main body that houses a pressure-actuated sound generator and that has outer surfaces from which a plurality of brushes extend; and an outer shell that covers at least a portion of the main body such that a gap exists between the shell and the outer surfaces of the main body, wherein the outer shell includes a plurality of brush ports aligned with the brushes; wherein the outer shell is sufficiently flexible to be compressed inward by a selected animal's jaws such that toothpaste is distributed via the brushes to teeth of the selected animal and such that sounds are generated, via the pressure-actuated sound generator housed in the main body, more or less simultaneously with the distribution of toothpaste.

In a feature of this aspect, the pressure-actuated sound generator includes a squeaker bellows chamber.

In another feature of this aspect, the main body is an elongate structure, and wherein the outer shell is a sleeve that covers most or all of the main body. In further features, a removable end cap is disposed at one end of the main body; the removable end cap is coupled to the main body via a threaded coupling mechanism; and/or a squeaker cap, including a squeaker outlet in fluid communication with a squeaker bellows chamber, is disposed at the opposite end of the main body.

In another feature of this aspect, the shell is removable from the main body to provide access to the main body. In further features, the main body includes toothpaste surfaces, disposed between the brushes, which are accessible when the shell is removed from the main body; the shell is a cylindrical sleeve that includes structural features to prevent rotation of the sleeve around the main body, thereby keeping the brush ports aligned with the brushes; the shell is a cylindrical sleeve that includes structural features to prevent rotation of the sleeve around the main body, thereby keeping the brush ports aligned with the brushes; and/or the outer shell is sufficiently flexible and resilient to spring outward, after being compressed inward by the selected animal's jaws, such that the brushes are alternately exposed and retracted through the brush ports, and move in and out of the selected animal's teeth, in a reciprocating brushing manner with successive chewing by the selected animal.

Broadly defined, the present invention according to one aspect is a pet dental device, including: an elongate main body having outer surfaces from which a plurality of brushes extend; an elongate outer sleeve that covers at least a portion of the main body such that a gap exists between the sleeve and the outer surfaces of the main body, wherein the outer sleeve includes a plurality of brush ports aligned with the brushes; a first end cap disposed at a first end of the main body; and a second end cap disposed at a second end of the main body; wherein the outer sleeve is sufficiently flexible to be compressed inward by a selected animal's jaws such that toothpaste is distributed via the brushes to teeth of the selected animal.

In a feature of this aspect, the main body houses a pressure-actuated sound generator, and wherein sounds are generated, via the pressure-actuated sound generator housed in the main body, more or less simultaneously with the distribution of toothpaste. In further features, the pressure-actuated sound generator includes a squeaker bellows chamber; and/or a squeaker outlet is disposed in the second end cap in fluid communication with the squeaker bellows chamber.

In another feature of this aspect, the first end cap is removable. In a further feature, the removable end cap is coupled to the main body via a threaded coupling mechanism.

In another feature of this aspect, the sleeve is removable from the main body to provide access to the main body. In further features, the main body includes toothpaste surfaces, disposed between the brushes, which are accessible when the sleeve is removed from the main body; and/or the sleeve is cylindrical and includes structural features to prevent rotation of the sleeve around the main body, thereby keeping the brush ports aligned with the brushes.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
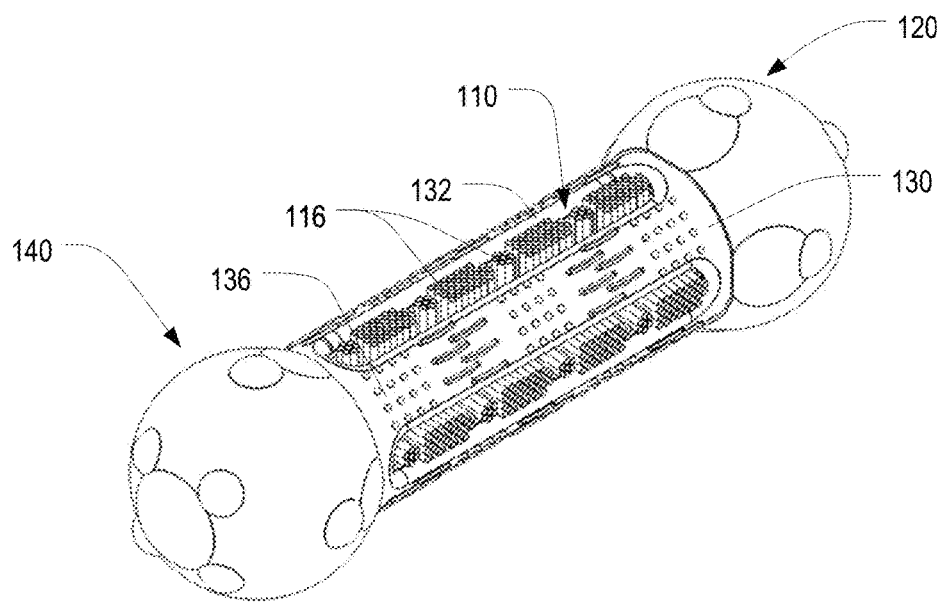
FIG. 1 is an orthogonal view of a dog dental device in accordance with a first preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2:
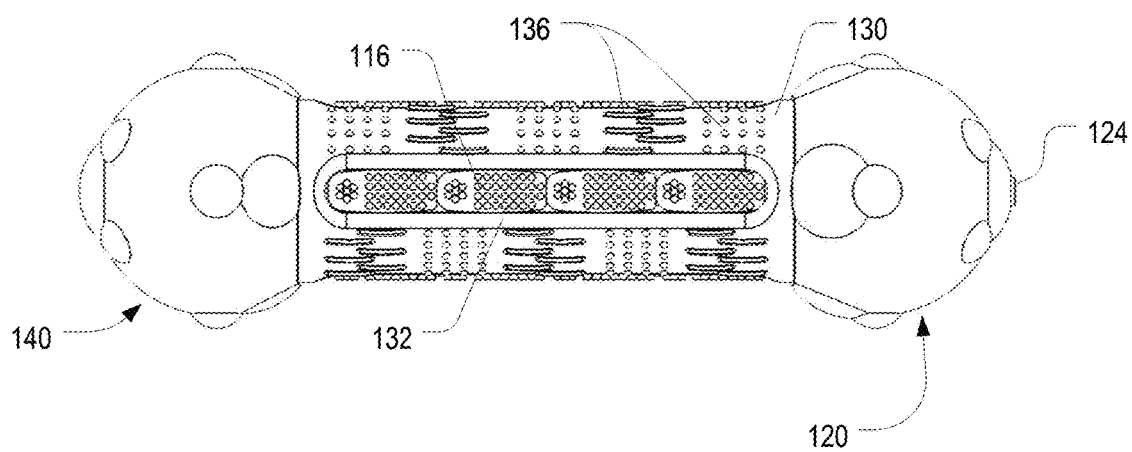
FIG. 2 is a front view of the dog dental device of FIG. 1.
Figure 3:
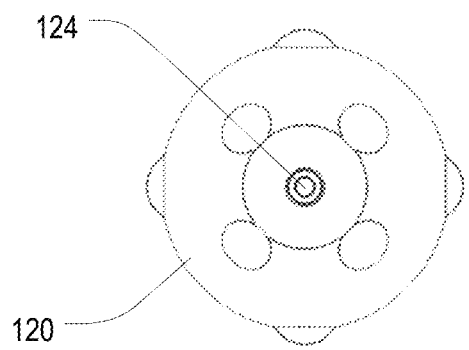
FIG. 3 is a right end view of the dog dental device of FIG. 1.

FIG. 1 is an orthogonal view of a dog dental device 100 in accordance with a first preferred embodiment of the present invention, while FIGS. 2 and 3 are a front view and a right end view, respectively, of the dog dental device 100 of FIG. 1. As shown therein, the dental device 100 includes a main body 110, an outer sleeve 130 that covers the main body 110, a squeaker cap 120 at one end of the main body 110, and an end cap 140 at the other end. In the illustrated embodiment, the squeaker cap 120 is at the right end and looks very similar to the end cap 140 at the left end, but in alternative embodiments may have a very different appearance to distinguish the ends, provide visual or tactile interest, or the like. The squeaker cap 120 is part of a squeaker apparatus that also includes a squeaker outlet 124 that is perhaps best shown in FIG. 3.

Figure 4:
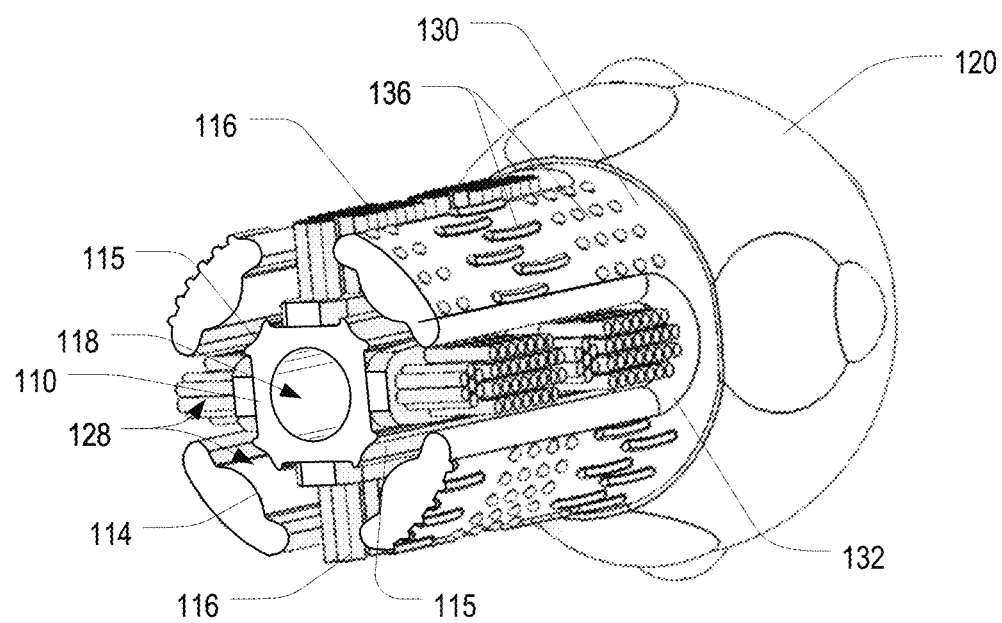
FIG. 4 is a left end cutaway view of the dog dental device of FIG. 1.

FIG. 4 is a cutaway of the dog dental device 100 of FIG. 1, showing the outer sleeve 130 surrounding the main body 110. Toothpaste surfaces 115 and brushes 116 are located on the outside of the main body 110, while a squeaker bellows chamber 118 is located inside the main body 110. The outer sleeve 130 includes one or more brush ports 132 which allow the brushes 116 on the main body 110 to extend through the outer sleeve 130. The brushes 116 may be arranged in various ways, but include a plurality of upright, narrow, closely-spaced, elongate members that extend perpendicularly (or generally so) from a base. The brushes 116 may be made of any conventional toothbrush bristle material or of other animal-safe material and preferably provide at least some durability against repeated use by the jaws of an animal. In at least some embodiments, the outer sleeve 130 includes tongue cleaners 136, which are three-dimensional surface features that clean the coating on the upper surface of the dog's tongue and also may aid in cleaning the dog's teeth. The tongue cleaners 136 can be of any design known by an Ordinary Artisan.

Figure 5:
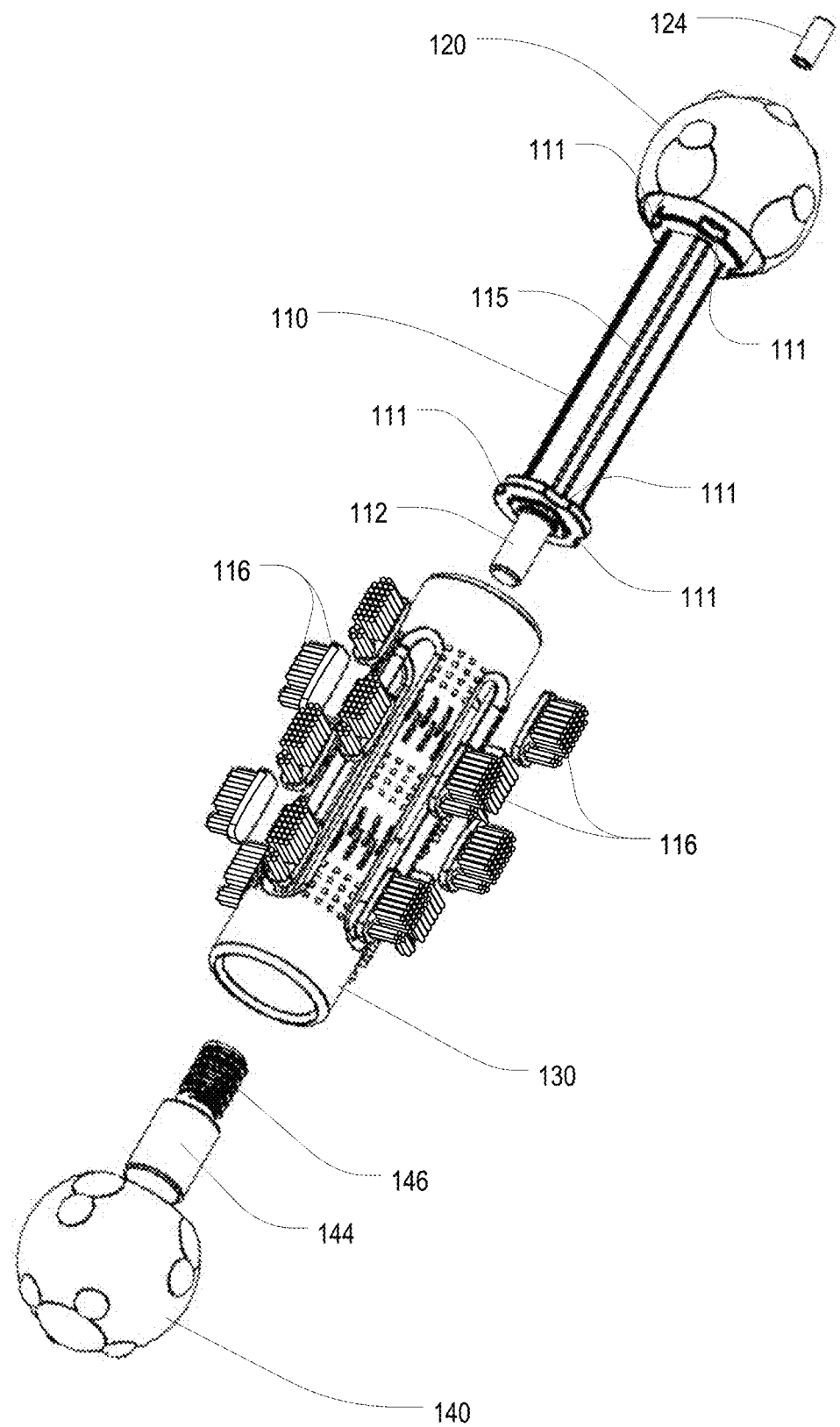
FIG. 5 is an exploded orthogonal view of the dog dental device of FIG. 1.
Figure 6:
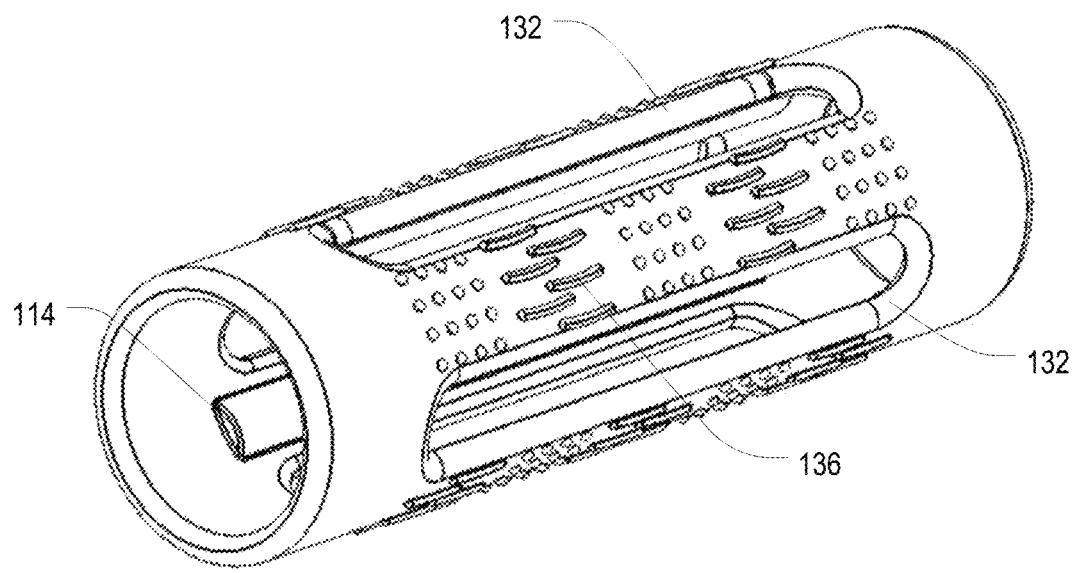
FIG. 6 is an orthogonal view of the outer sleeve of the dog dental device in FIG. 1.

FIG. 5 is an exploded view of the dog dental device in FIG. 1, and FIG. 6 is an orthogonal view of the outer sleeve 130 of the dog dental device in FIG. 1. In order to keep the brush ports 132 rotationally aligned with the brushes 116, the outer sleeve 130 is preferably rotationally coupled to the main body 110. In at least some embodiments, this is accomplished at least in part via one or more male slide retainer surfaces 114 on the inside of the outer sleeve 130, perhaps best shown in FIG. 6, and correspondingly-shaped female slide retainers 111 located at both ends of the main body 110, perhaps best shown in FIG. 5. The female slide retainers 111 on the main body 110 mate with the male slide retainers 114 on the outer sleeve 130 when the outer sleeve 130 is installed on the main body 110, as further described hereinbelow.

Figure 7:
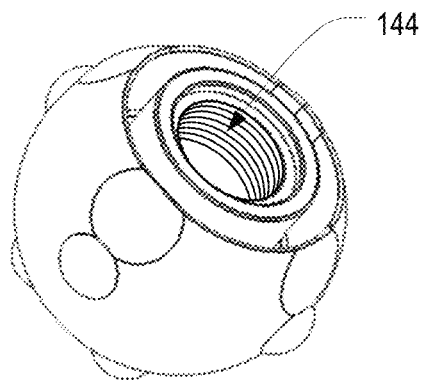
FIG. 7 is an orthogonal view of the end cap of the dog dental device in FIG. 1.
Figure 8:
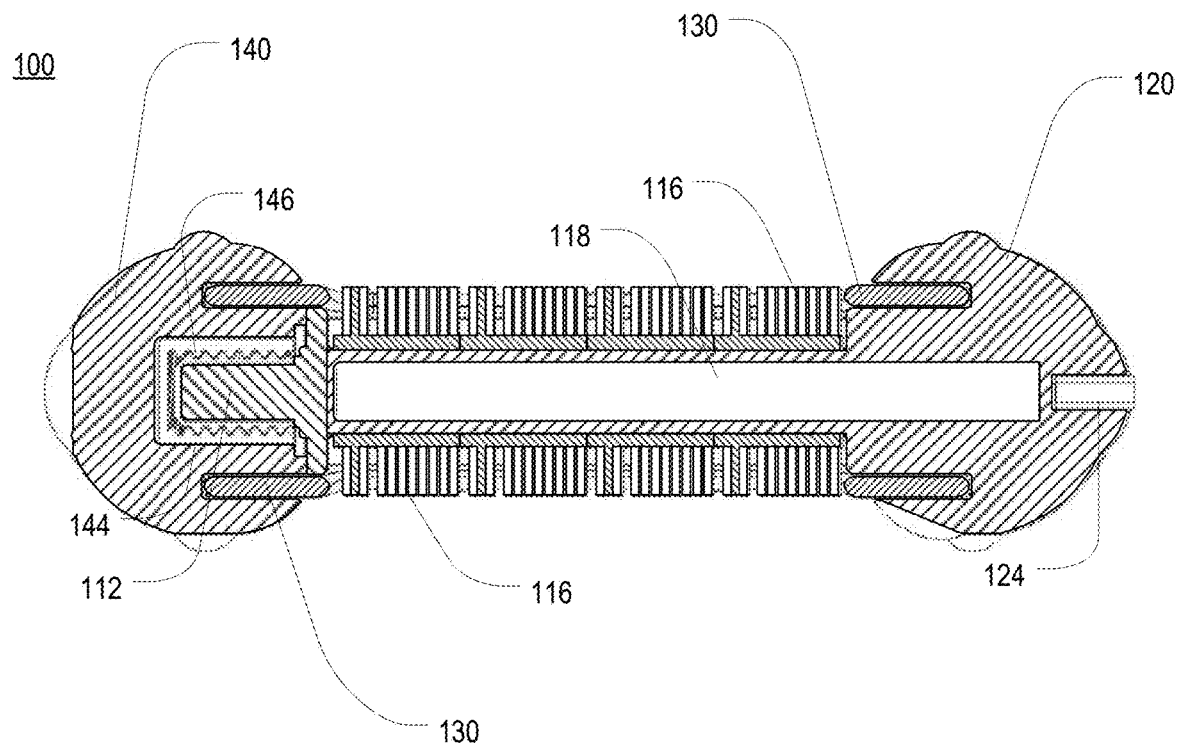
FIG. 8 is a front cross-sectional view of the dog dental device of FIG. 1.

As perhaps best shown in FIG. 5, the end cap 140 is removably coupled to the main body 110, thereby permitting the outer sleeve 130 to be removed from the main body 110. In this regard, FIG. 7 is an orthogonal view of the end cap of the dental device in FIG. 1, and FIG. 8 is a front cross-sectional view of the dog dental device 100 of FIG. 1. In the illustrated embodiment, the end cap 140 contains the female fastener part 144 of a threaded coupling mechanism. The female fastener part 144 may be formed as part of the end cap 140 or may be formed separately and embedded or otherwise attached to the end cap 140. The male fastener part 146 is attached to or formed as a part of the main body 110. In alternative embodiments, the coupling mechanism may consist of a snap system, a twist lock system, and/or or any other such fastening method know by an Ordinary Artisan used for the purposes described herein. In some embodiments the main body 110 also includes an internal stem 112 on which the male part 146 of the coupling mechanism is mounted, while in other embodiments the male part 146 is attached directly to the main body 110, and in still other embodiments the male part 146 is formed as a part of the main body 110.

As perhaps best shown in FIG. 4, gaps exist between the toothpaste surfaces 115 and the inner surfaces of the outer sleeve 130, including adjacent the male slide retainer surfaces 114. The gaps and open space between the main body 110 and outer sleeve 130 create a toothpaste chamber 128 while the squeaker bellows chamber 118 is a second chamber, thus creating dual chambers in the dental device 100.

Figure 9:
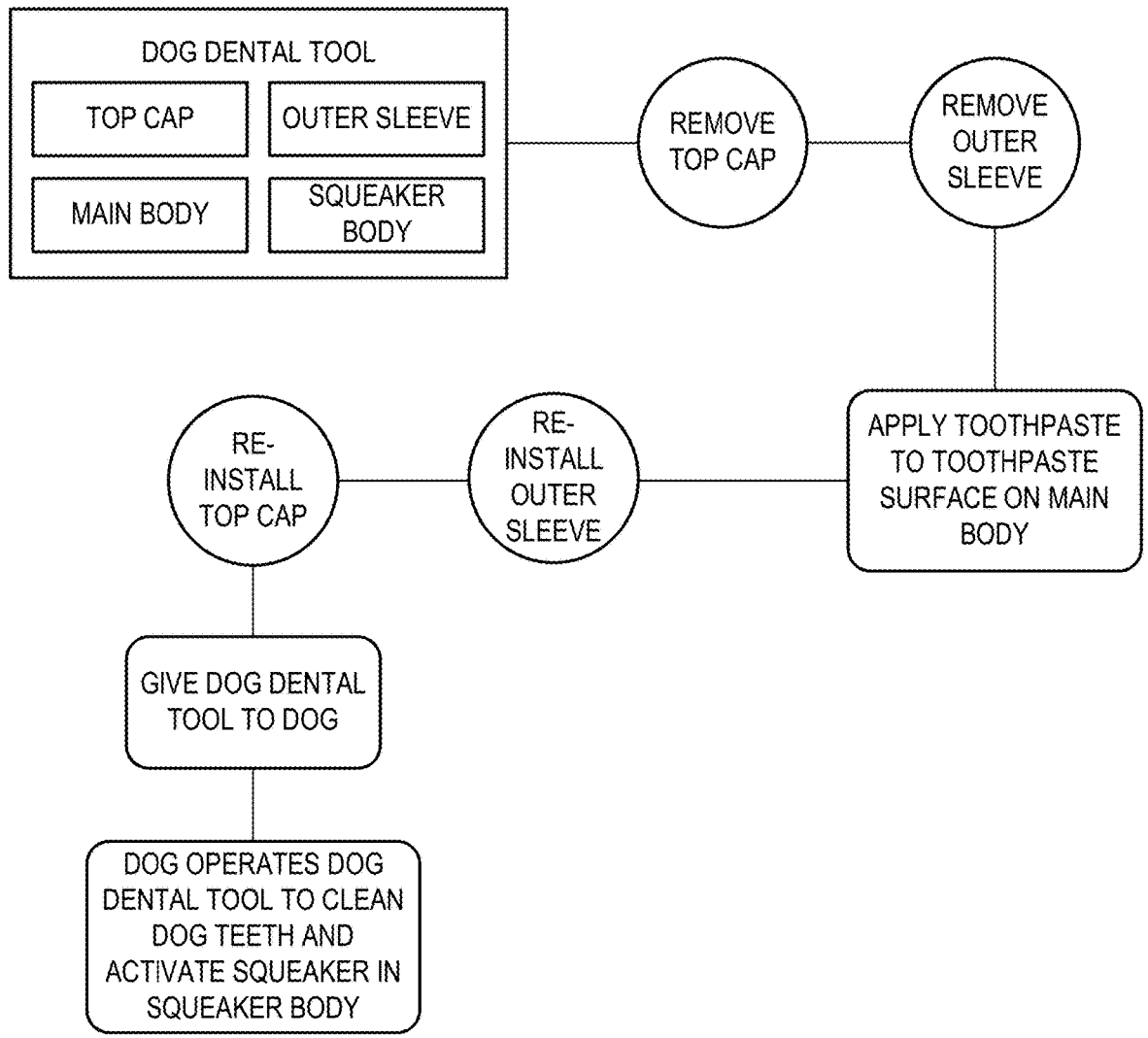
FIG. 9 is a flow diagram illustrating a first method of use of a dog dental device in accordance with one or more preferred embodiments of the present invention.
Figure 10:
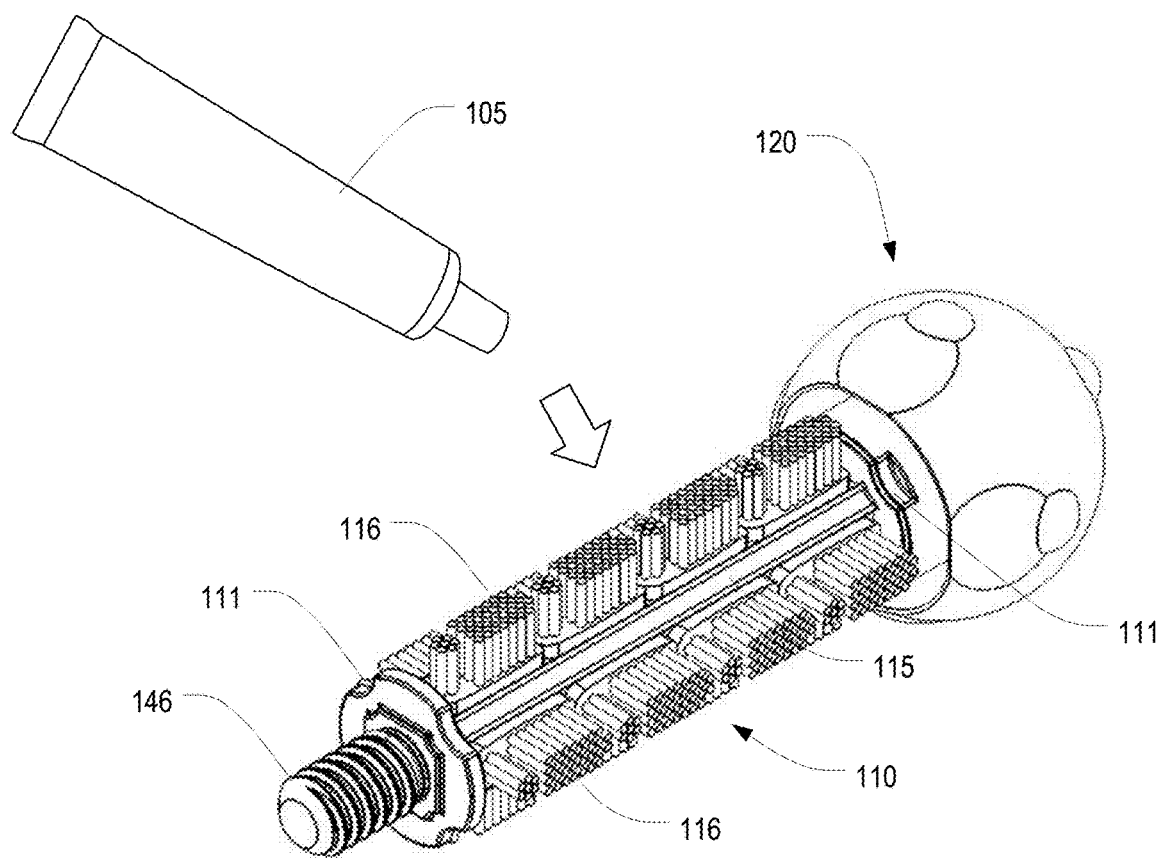
FIG. 10 is an orthogonal view of the dog dental device of FIG. 1, with the end cap and outer sleeve removed, illustrating the application of toothpaste to the main body.

FIG. 9 is a block diagram showing a first method of use of the dog dental device 100 of FIG. 1. The user 102 first removes the end cap 140. Next, the user 102 removes the outer sleeve 130, exposing the main body 110 and toothpaste surfaces 115. The user 102 may then apply toothpaste 105 onto one or more toothpaste surface 115. In this regard, FIG. 10 is an orthogonal view of the dog dental device 100 of FIG. 1, with the end cap 140 and outer sleeve 130 removed, illustrating the application of toothpaste 105 to the main body 110. Once the toothpaste surface 115 is covered with toothpaste 105, the user 102 re-installs the outer sleeve 130 by first lining up the male and female slide retainers 114,111, then sliding the outer sleeve 130 onto the main body 110. With such alignment, the brushes 116 are correctly oriented to sit within the brush ports 132, as shown for example in FIGS. 1 and 2.

Next, the user 102 re-installs the end cap 140 by threading it onto the main body 110 or otherwise coupling it to the main body 110. Notably, when the end cap 140 is fully threaded or otherwise coupled to the main body 110, the end of the outer sleeve 130 is recessed into the end cap 140, as perhaps best shown in FIG. 8. This helps ensure that the lips or whiskers of the dog 104 are not pinched between two device parts and prevents the dog 104 from accessing the end of the outer sleeve 130 with its teeth 106. Finally, when the dog dental device 100 is completely reassembled, the user 102 gives the dental device 100 to the dog 104 and the dog 104 operates the device 100 by chewing while effectively cleaning his or her teeth 106 in the process.

In some preferred embodiments the main body 110, outer sleeve 130, end cap 140, and squeaker cap 120 are made with a flexible material such as rubber, thermoplastic rubber (TPR) or a thermoplastic elastomer (TPE), or other such flexible material. In another embodiment, parts 110,120,130, 140 of the dental device 100, may also be made of flexible eatable materials such as potato starch, bacon fat, pea protein and/or other such eatable food ingredients. For high production, in some embodiments, some or all of the dental device 100 can be made with an injection molding process or other such manufacturing processes know by an ordinary artisan.

Figure 11:
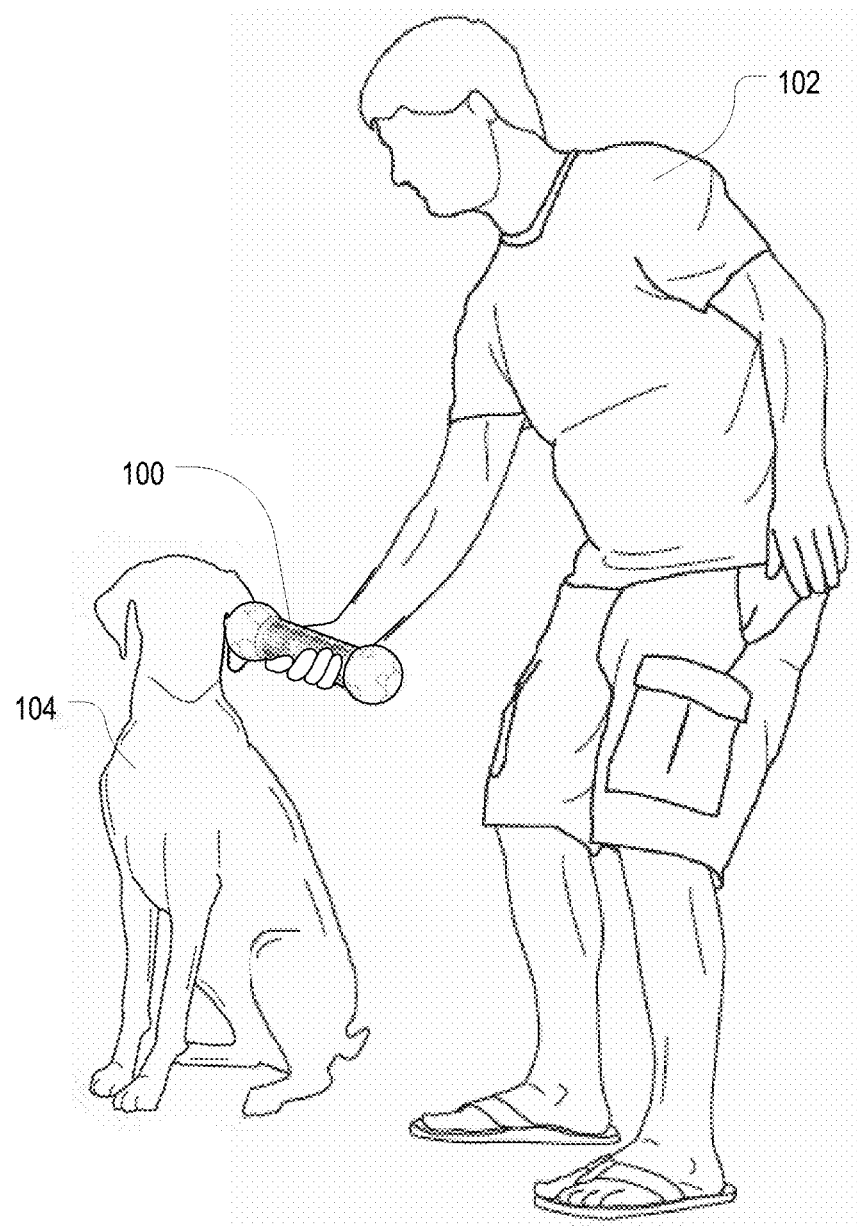
FIG. 11 is an illustration of the dog dental device of FIG. 1 being given to a pet dog by a user.
Figure 12:
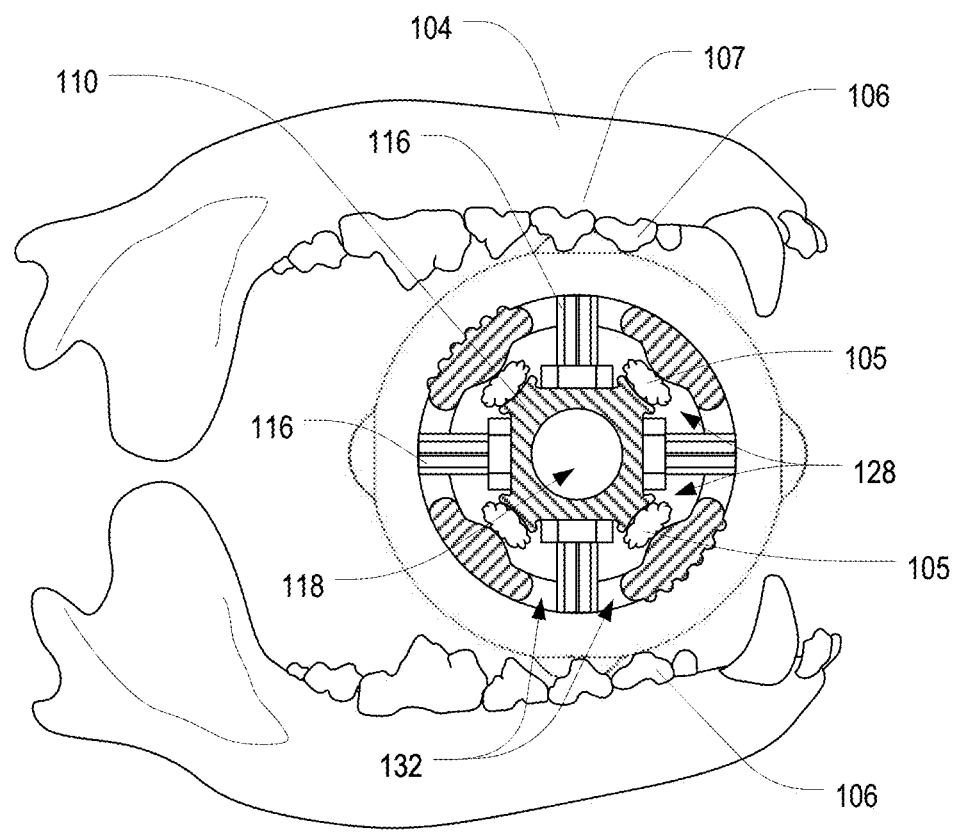
FIG. 12 is an end cross-sectional view of the dog dental device of FIG. 1 being held between the teeth of a dog.

FIG. 11 is an illustration of the dog dental device 100 of FIG. 1 being given to a pet dog 104 by a user 102, and FIG. 12 is an end cross-sectional view of the dog dental device 100 of FIG. 1 being held between the teeth 106 of a dog 104. Notably, as the outer sleeve 110 is squeezed by the action of the dog's teeth 106, its interior surfaces, such as the male slide retainers 114, are pressed inward and sometimes sideways, thereby compressing the toothpaste chamber 128 and displacing the toothpaste 105. As a result, the toothpaste 105 tends to be forced into the brushes 116. Thus, as the dog 104 chews the device 100, toothpaste 105 moves from the toothpaste chamber 128 to the brushes 116 and then to the dog's teeth 106 and mouth. At the same time, further force presses the outer sleeve 130 more firmly against the main body 110, causing the squeaker bellows chamber 118 to be compressed. This, in turn, forces air through the squeaker outlet 124 to create a "squeaking" sound. Additionally, when the main body 110 flexes inward, the brushes 116 extend more fully through the brush ports 132, contacting the dog teeth 106 and gums 107, thus allowing the dental device to both brush the teeth 106, massage the gums 107, and squeak simultaneously.

The outer sleeve 130 as well as portions of the main body 110 around the squeaker bellows chamber 118 are preferably flexible and provide spring resistance against downward chewing motions of a dog 104. As a result, the dental device 100 returns to its original shape after compression. As a dog 104 repetitively chews the device 100, and repeatedly moves his or her mouth open and closed on the dog dental device 100, the brushing, massaging and squeaking action repeat, thus resulting in repetitive squeaking sounds and brushing. Notably, when the animal's jaws operate to compress and release the outer sleeve 130, the brushes 116 alternately protrude more fully through the ports before retracting back into the sleeve 130. As a result, the brushes 116 tend to move in and out of the animal's teeth in a reciprocating brushing manner with successive chewing by the animal 104.

Figure 13:
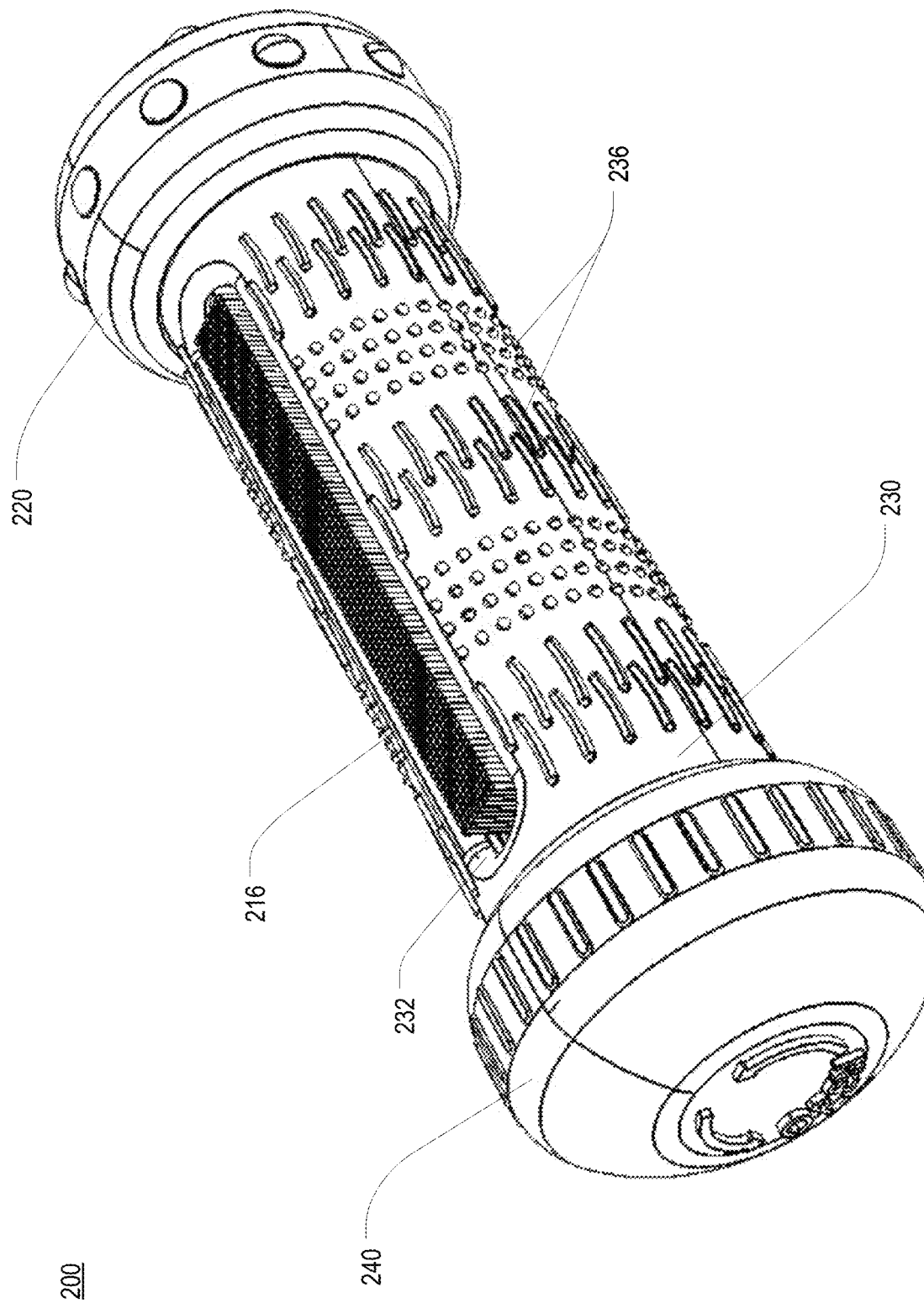
FIG. 13 is an orthogonal view of a dog dental device in accordance with a second preferred embodiment of the present invention.
Figure 14:
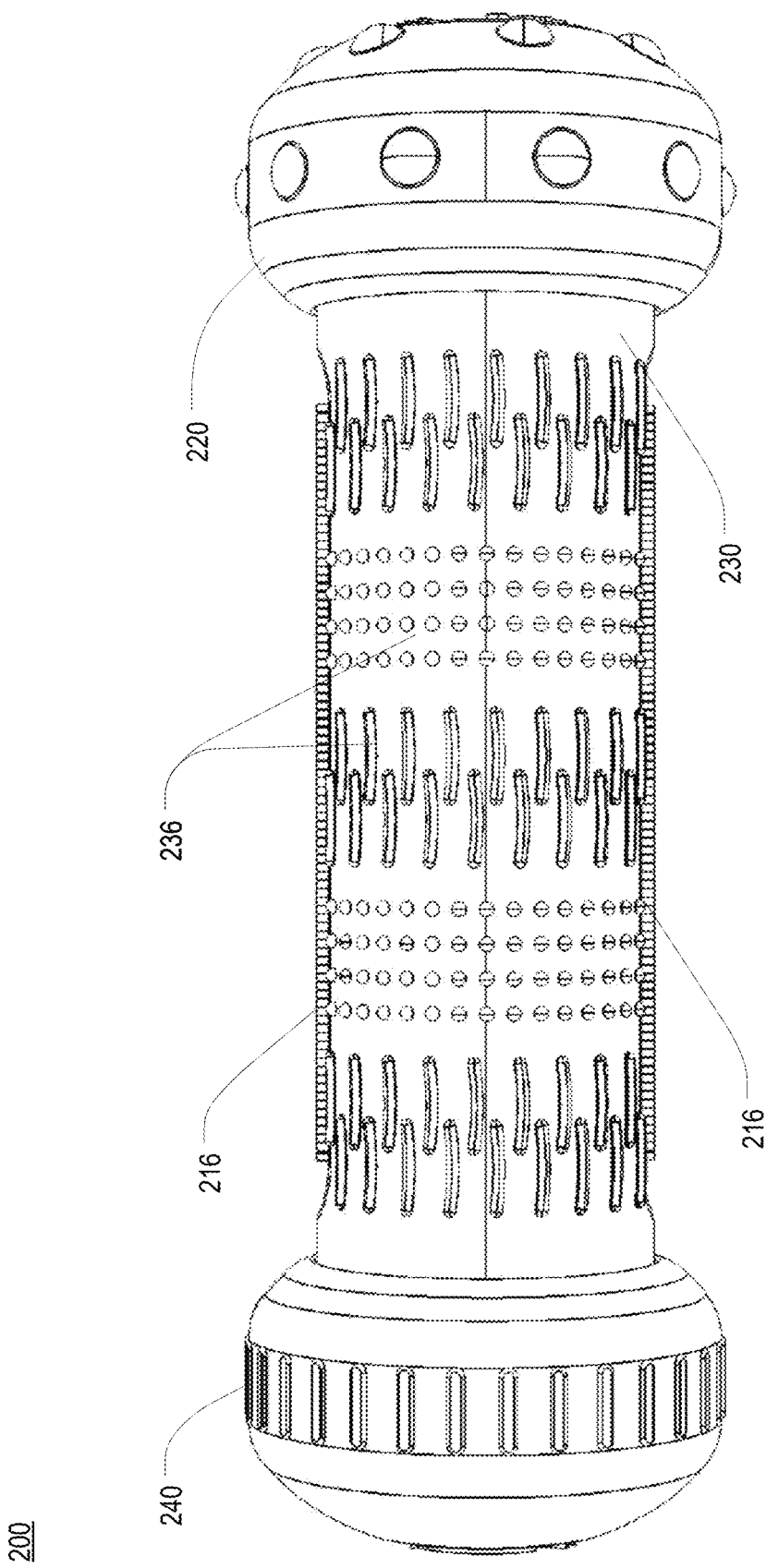
FIG. 14 is a front view of the dog dental device of FIG. 13.
Figure 15:
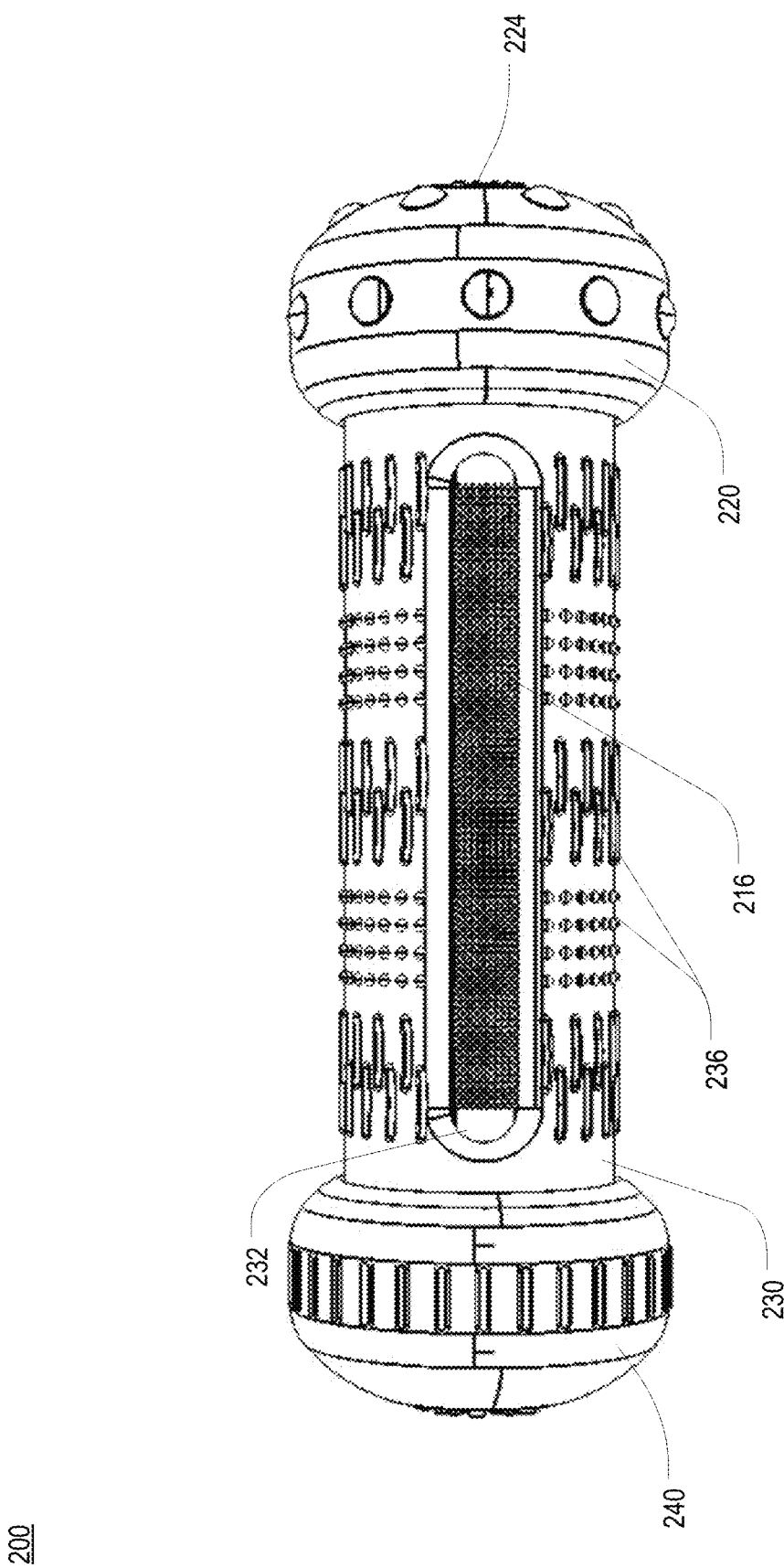
FIG. 15 is a top view of the dog dental device of FIG. 13.

FIG. 13 is an orthogonal view of a dog dental device 200 in accordance with a second preferred embodiment of the present invention, while FIGS. 14 and 15 are a front view and a top view, respectively, of the dog dental device 200 of FIG. 13. As with the device 100 of FIG. 1, the dental device 200 includes a main body 210, an outer sleeve 230 that covers the main body 210, a squeaker cap 220 at one end of the main body 210, and an end cap 240 at the other end.

Figure 16:
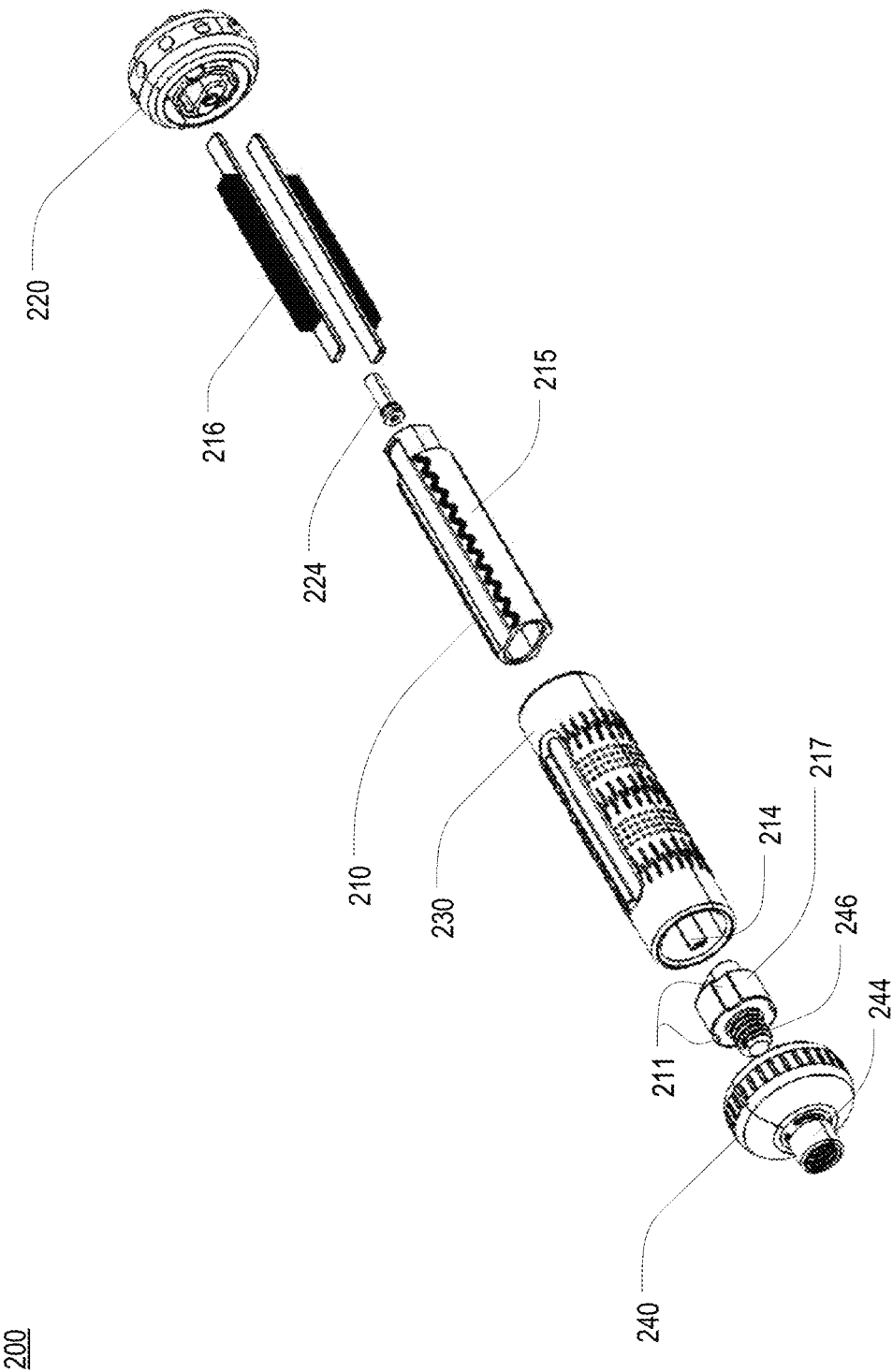
FIG. 16 is an exploded orthogonal view of the dog dental device of FIG. 13.
Figure 17:
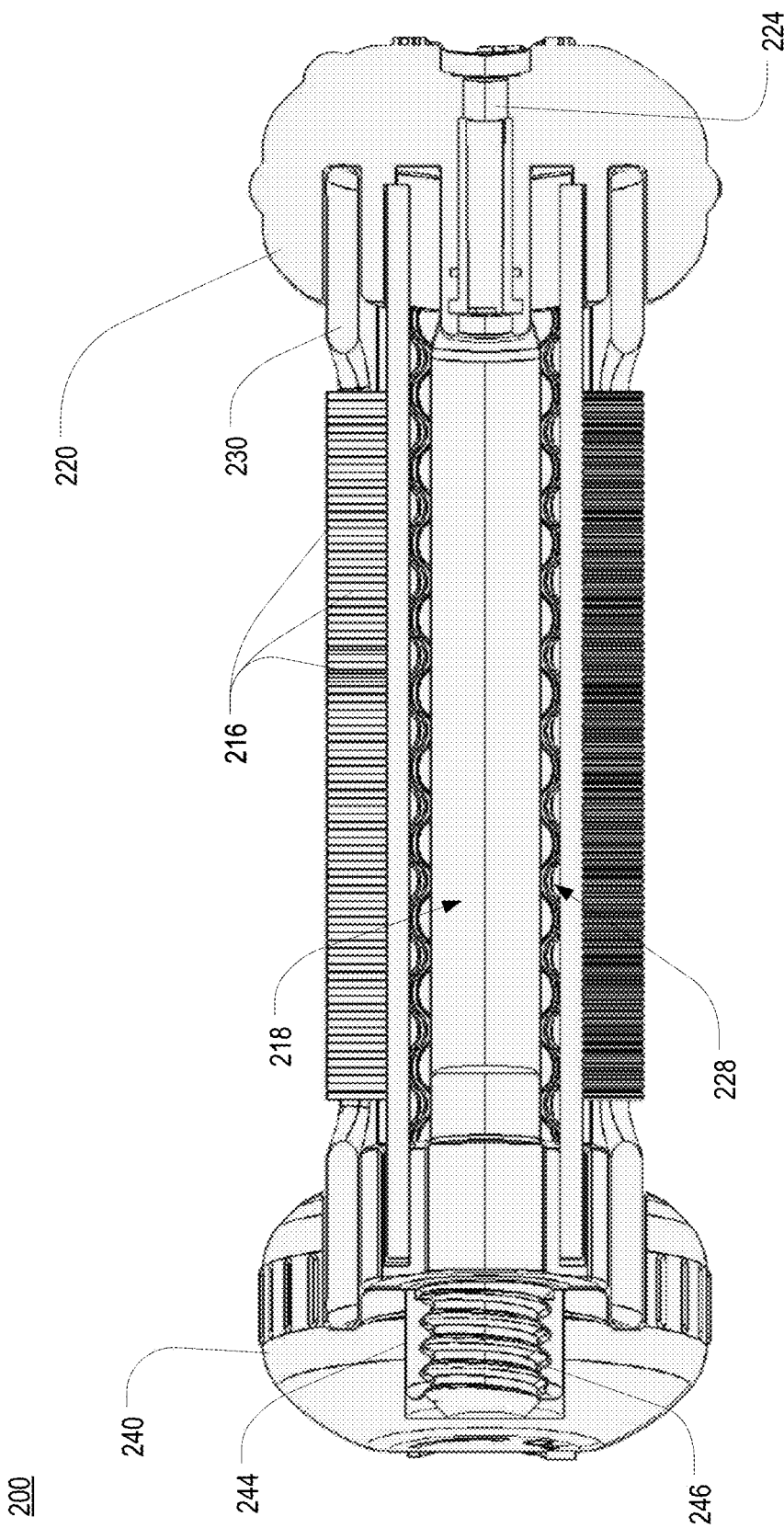
FIG. 17 is a front cutaway view of the dog dental device of FIG. 13.

FIGS. 16 and 17 are an exploded orthogonal view and a front cutaway view, respectively, of the dog dental device 200 of FIG. 13. Toothpaste surfaces 215 (shown in FIG. 16) and brushes 216 are located on the outside of the main body 210, while a squeaker bellows chamber 218 is located inside the main body 210. The outer sleeve 230 contains tongue cleaners 236 as well as brush ports 232 which allow brushes 216 on the main body 210 to extend through the brush ports 232.

The end cap 240 is preferably removably coupled to the main body 210, thereby permitting the outer sleeve 230 to be removed from the main body 210. In one preferred embodiment, the end cap 240 contains the female part 244 of a threaded coupling mechanism and the male part 246 is part of the main body 210. In the illustrated embodiment, the female fastener part 244 is formed separately and embedded or otherwise attached to the end cap 240, but in other embodiments the female fastener part 244 may be formed as part of the end cap 240. Similarly, in the illustrated embodiment the male part 246 is formed separately and attached to the main body 210, but in other embodiments the main body may include an internal stem on which the male part 246 of the coupling mechanism is mounted, and in still other embodiments the male part 246 is formed as a part of the main body 210.

The main body 210 (including the male part 244 of the coupling mechanism) includes female slide retainers 211 which mate with male slide retainers 214 on internal surfaces of the outer sleeve 230. FIG. 16 also shows how the outer sleeve 230 is recessed into the main body 210 so the lips or whiskers of the dog 104 are not pinched between two device parts and prevents the dog 104 from accessing the end of the outer sleeve 230 with its teeth 106.

As with the dog dental device 100 of the first embodiment, gaps exist between the toothpaste surfaces 215 and the inner surfaces of the outer sleeve 230, including adjacent the male slide retainers 214. The gaps and open space between the main body 210 and outer sleeve 230 create a toothpaste chamber 228 while the squeaker bellows chamber 218 is a second chamber, thus creating dual chambers in the dental device 200. A squeaker outlet 224 extends from the squeaker bellows chamber 218 through the squeaker cap 220.

Figure 18:
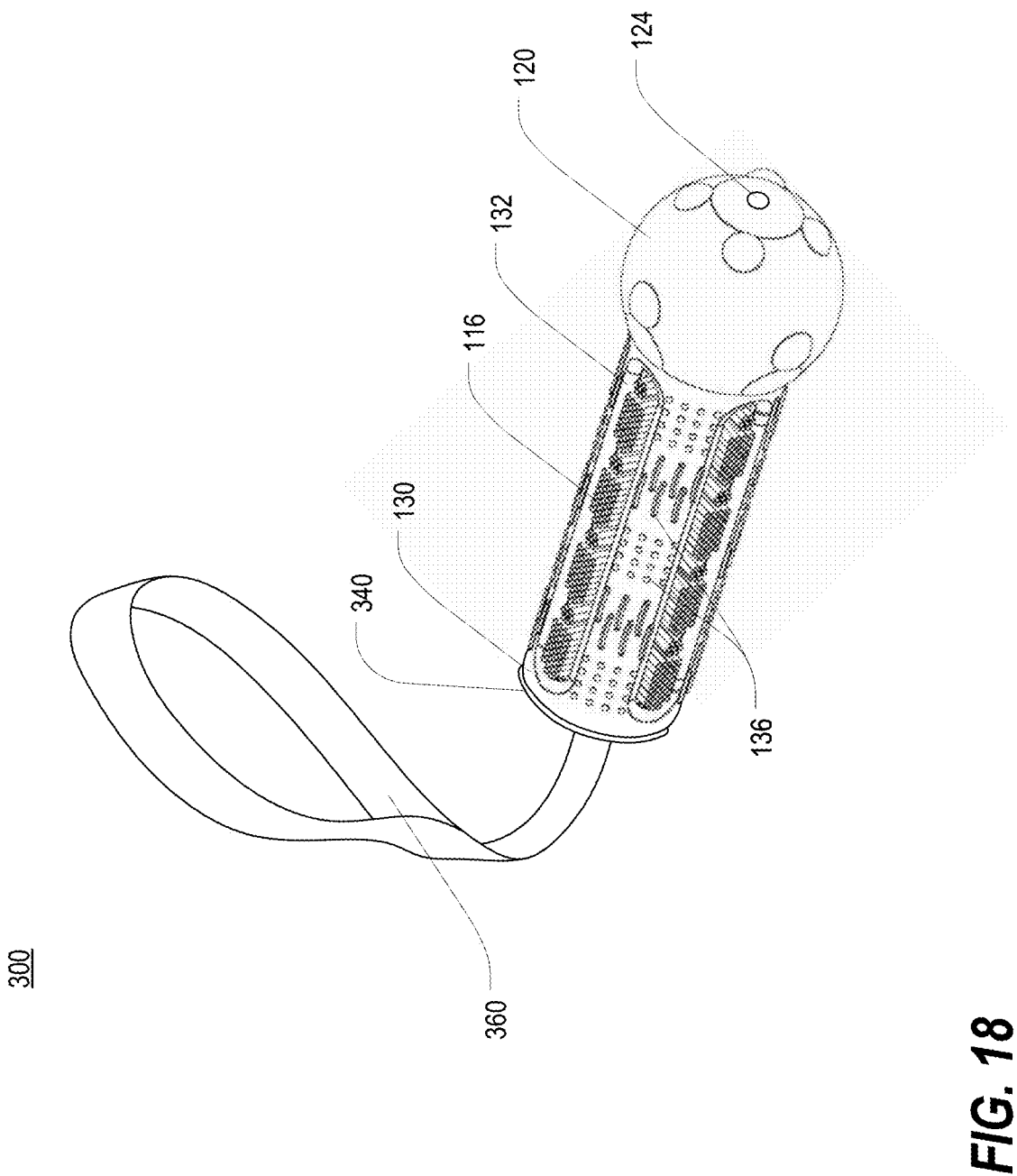
FIG. 18 is an orthogonal view of a dog dental device with a tug strap in accordance with one or more further preferred embodiments of the present invention.

In various embodiments, the main body may be shaped in shapes other than the elongated shapes of the devices 100,200 of FIGS. 1 and 13, such as a ball, a tug toy, a stick, a whimsically-designed creature, or other such shape that would be interesting to a dog. For example, FIG. 18 is an orthogonal view of a dog dental device 300 with a tug strap 360 in accordance with one or more further preferred embodiments of the present invention. As with previously described embodiments, the dog dental device 300 includes a main body 110, an outer sleeve 130 that covers the main body 110, a squeaker body 120 at one end of the main body 110, and an end cap 340 at the other end. The outer sleeve 130 contains tongue cleaners 136 as well as brush ports 132 which allow brushes 116 on the main body 110 to extend through the brush ports 332. The dental device 300 includes a tug strap 360 attached at the end of the main body 110 extending from the end cap 340. A user 102 may pull on the tug strap 360 to encourage the dog 104 to play "tug-of-war" with the dental device 300, thus forcing the dog 104 into "brushing" his or her teeth 106 and activating the squeaker outlet 124 while playing.

Figure 19:
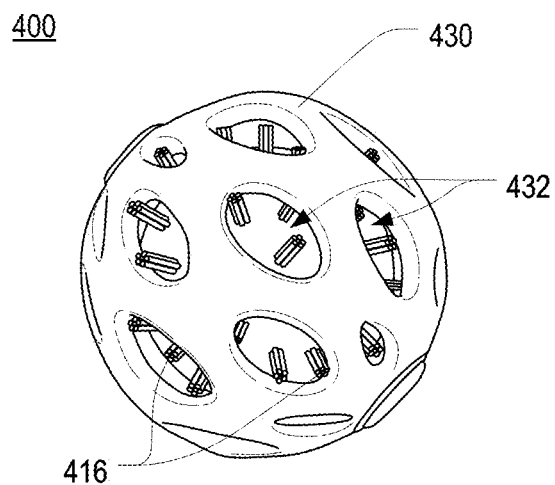
FIG. 19 is an orthogonal view of a ball-type dog dental device in accordance with one or more further preferred embodiments of the present invention.
Figure 20:
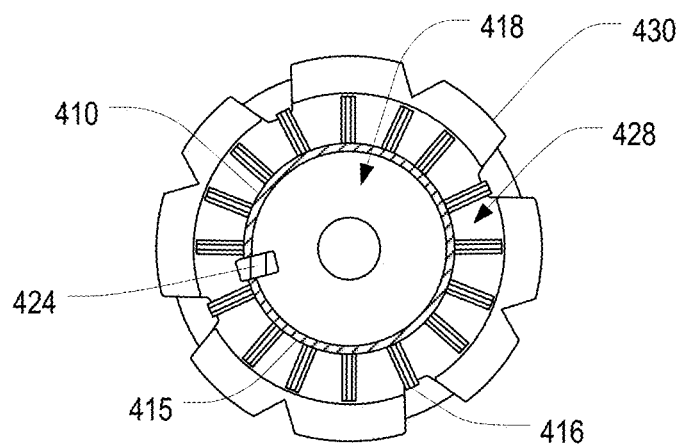
FIG. 20 is a cross-sectional view of the ball-type dog dental device of FIG. 19.

FIG. 19 is an orthogonal view of a ball-type dog dental device 400 in accordance with one or more further preferred embodiments of the present invention, and FIG. 20 is a cross-sectional view of the ball-type dog dental device 400 of FIG. 19. By throwing or launching the dental device ball 400, a user 102 can encourage a dog 104 to fetch and retrieve the ball 400 while simultaneously brushing his or her dog teeth 106. The ball 400 includes an outer sleeve or shell 430 that covers a main body 410. The main body includes a squeaker bellows chamber 418, a squeaker outlet 424, toothpaste surfaces 415, and brushes 416. The outer sleeve 430 contains brush ports 432 which allow brushes 416 on the main body 410 to extend through the brush ports 432. In some embodiments, the outer sleeve 430 may also contains tongue cleaners (not shown). In other embodiments, the ball-type dental device 400 may also contain a tug strap 360. The open space between the main body 410 and outer sleeve 430 creates a chamber 428 while the squeaker bellows chamber 418 is a second chamber, thus creating dual chambers in the dental device 400.

In some embodiments, the outer shell 430 of the ball-type dog dental device 400 may be bifurcated or otherwise partitioned such that at least a portion of the shell may be removed to access the toothpaste chamber 428.

To help enable various levels of brushing in different size dogs, the dog dental device 100,200,300,400 may have one or more brush ports 132,232,332,432 and each brush port may have one or more brushes 116,216,316,416 which extend out where they may make contact with the dog teeth 106. Each preferred embodiment described herein shows a different number of brush ports and brushes as examples of a variety of configurations.

Figure 21:
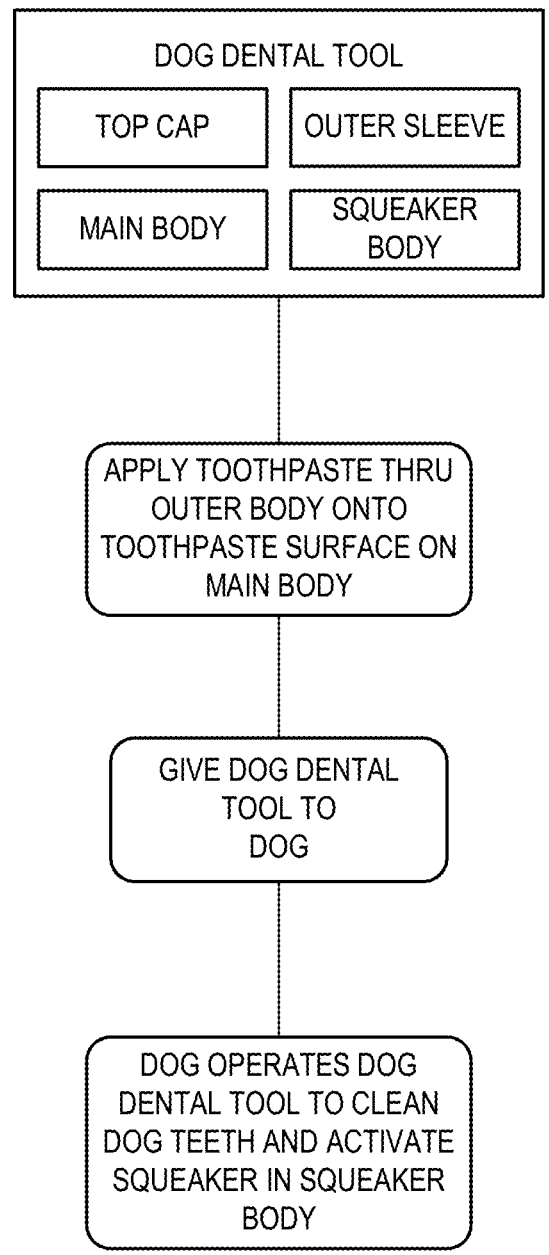
FIG. 21 is a flow diagram illustrating a second method of use of a dog dental device in accordance with one or more preferred embodiments of the present invention.

FIG. 21 is a flow diagram illustrating a second method of use of a dog dental device 100,200,300,400 in accordance with one or more preferred embodiments of the present invention. The user 102 applies toothpaste 105 directly onto the toothpaste surface 115 through the brush ports 116,216, 316,416. Then the user 102 gives the dental device 100,200, 300,400 to the dog 104 and the dog 104 operates the device 100,200,400 by chewing and thus automatically cleans his or her teeth 106. In the case of the dental device 300 the user may play tug-of-war instead of simply giving the dog 104 the device.

Figure 22:
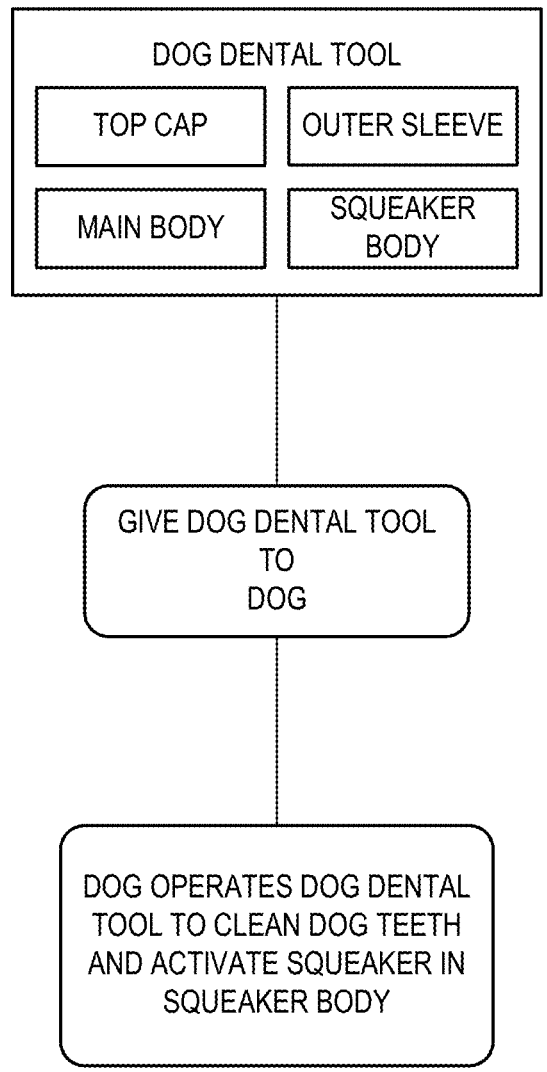
FIG. 22 is a flow diagram illustrating a third method of use of a dog dental device in accordance with one or more preferred embodiments of the present invention.

FIG. 22 is a flow diagram illustrating a third method of use of a dog dental device 100,200,300,400 in accordance with one or more preferred embodiments of the present invention. The device 100,200,300,400 is given to the dog 104 in a "dry" brushing state, without toothpaste 105, and the dog 104 then uses it to brush and clean their teeth 106.

The systems and related devices described herein may be used all together, separately, or in any combination. The systems may be used for a dog dental device 100,200,300, 400 based on the use of the various components and manufacturing processes of the present invention.

Devices in accordance with the present invention may be provided commercially in the form of different sizes, and in some cases the different sizes may have different designs. For example, the device 100 of FIG. 1 may be sold for use with larger dogs, while the device 200 of FIG. 13 may be sold for use with smaller dogs.

The toothpaste 105 referenced herein may be a conventional or specially formulated toothpaste, butter, spread, paste, or gel or any other cleaning or breathe freshener agent suitable for the device described herein. In some cases, toothpaste specially formulated for use with dogs or other pets and animals may be packaged and sold with any of the devices described herein.

The devices and methods of use described and illustrated herein have generally been set forth for use with dogs, but it will be appreciated that such devices and methods may, in at least some embodiments, be applicable for other types of pets and animals, although appropriate size and material modifications may be necessary depending on the animal type.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A pet dental device, comprising:
   (a) a main body that houses a pressure-actuated sound generator and that has outer surfaces from which a plurality of brushes extends; and
   (b) an outer shell that covers at least a portion of the main body such that a gap exists between the outer shell and the outer surfaces of the main body, wherein the outer shell includes a plurality of brush ports aligned with the brushes;
   (c) wherein the outer shell is sufficiently flexible to be compressed inward by a selected animal's jaws such that toothpaste is distributed via the brushes to teeth of the selected animal and such that sounds are generated, via the pressure-actuated sound generator housed in the main body, more or less simultaneously with the distribution of toothpaste;
   (d) wherein the main body is an elongate structure, and wherein the outer shell is a sleeve that covers most or all of the main body;
   (e) wherein a removable end cap is disposed at one end of the main body; and
   (f) wherein a squeaker cap, including a squeaker outlet in fluid communication with a squeaker bellows chamber, is disposed at the opposite end of the main body.

2. The pet dental device of claim 1, wherein the removable end cap is coupled to the main body via a threaded coupling mechanism.

3. The pet dental device of claim 1, wherein the outer shell is removable from the main body to provide access to the main body.

4. The pet dental device of claim 3, wherein the main body includes toothpaste surfaces, disposed between the brushes, which are accessible when the outer shell is removed from the main body.

5. The pet dental device of claim 4, wherein the outer shell is a cylindrical sleeve that includes structural features to prevent rotation of the sleeve around the main body, thereby keeping the brush ports aligned with the brushes.

6. The pet dental device of claim 1, wherein the outer shell is sufficiently flexible and resilient to spring outward, after being compressed inward by the selected animal's jaws, such that the brushes are alternately exposed and retracted through the brush ports, and move in and out of the selected animal's teeth, in a reciprocating brushing manner with successive chewing by the selected animal.

7. A pet dental device, comprising:
(a) an elongate main body having outer surfaces from which a plurality of brushes extends;
(b) an elongate outer sleeve that covers at least a portion of the main body such that a gap exists between the sleeve and the outer surfaces of the main body, wherein the elongate outer sleeve includes a plurality of brush ports aligned with the brushes;
(c) a pressure-actuated sound generator, including a squeaker bellows chamber;
(d) a first end cap disposed at a first end of the main body;
(e) a second end cap disposed at a second end of the main body; and
(f) a squeaker outlet disposed in the second end cap in fluid communication with the squeaker bellows chamber;
(g) wherein the elongate outer sleeve is sufficiently flexible to be compressed inward by a selected animal's jaws such that toothpaste is distributed via the brushes to teeth of the selected animal.

8. The pet dental device of claim 7, wherein at least one of the first and second end caps is a removable end cap.

9. The pet dental device of claim 8, wherein the removable end cap is coupled to the elongate main body via a threaded coupling mechanism.

10. The pet dental device of claim 7, wherein the elongate outer sleeve is removable from the elongate main body to provide access to the elongate main body.

11. The pet dental device of claim 10, wherein the elongate main body includes toothpaste surfaces, disposed between the brushes, which are accessible when the elongate outer sleeve is removed from the elongate main body.

12. The pet dental device of claim 10, wherein the elongate outer sleeve is cylindrical and includes structural features to prevent rotation of the sleeve around the elongate main body, thereby keeping the brush ports aligned with the brushes.

13. The pet dental device of claim 7, wherein the pressure-actuated sound generator is housed within the elongate main body.

14. The pet dental device of claim 13, wherein sounds are generated, via the pressure-actuated sound generator, more or less simultaneously with the distribution of toothpaste.

* * * * *